US011702183B2

(12) United States Patent
Laird et al.

(10) Patent No.: US 11,702,183 B2
(45) Date of Patent: Jul. 18, 2023

(54) ICE BATTERY VESSEL AND COLD ENERGY STORAGE

(71) Applicants: Arcosa Marine Products, Inc., Dallas, TX (US); REV Clean Power LLC, Houston, TX (US)

(72) Inventors: Thomas S. Laird, Houston, TX (US); Jesse Mark Brumbaugh, Houston, TX (US); Neal Langdon, Goodlettsville, TN (US)

(73) Assignees: ARCOSA MARINE PRODUCTS, INC., Dallas, TX (US); REV CLEAN POWER LLC, Houston, TX (US)

( * ) Notice: Subject to any disclaimer, the term of this patent is extended or adjusted under 35 U.S.C. 154(b) by 359 days.

(21) Appl. No.: 16/633,902

(22) PCT Filed: Nov. 22, 2017

(86) PCT No.: PCT/US2017/063056
§ 371 (c)(1),
(2) Date: Jan. 24, 2020

(87) PCT Pub. No.: WO2019/050554
PCT Pub. Date: Mar. 14, 2019

(65) Prior Publication Data
US 2020/0198750 A1 Jun. 25, 2020

Related U.S. Application Data

(60) Provisional application No. 62/556,675, filed on Sep. 11, 2017.

(51) Int. Cl.
B63J 2/14 (2006.01)
F24F 5/00 (2006.01)
F28D 20/02 (2006.01)

(52) U.S. Cl.
CPC ............... *B63J 2/14* (2013.01); *F24F 5/0017* (2013.01); *F25B 2400/24* (2013.01); *F28D 20/02* (2013.01)

(58) Field of Classification Search
CPC ... F24F 5/0017; F25B 2400/24; F25B 25/005; F28D 20/02; F25D 17/02; F25D 16/00; Y02E 60/14
See application file for complete search history.

(56) References Cited

U.S. PATENT DOCUMENTS 4,596,120 A    6/1986  Knodel et al.
5,649,431 A *  7/1997  Schroeder, Jr. ....... F24F 5/0017
                                                        62/434

(Continued)

FOREIGN PATENT DOCUMENTS

CN    204555150 U    8/2015
FR    2 742 218 A1    6/1997

(Continued)

OTHER PUBLICATIONS

International Preliminary Report on Patentability for PCT Patent Application No. PCT/US2017/063056, dated Mar. 26, 2020.

(Continued)

*Primary Examiner* — Kun Kai Ma
(74) *Attorney, Agent, or Firm* — Baker Botts L.L.P.

(57) ABSTRACT

According to some embodiments, a floating cold thermal energy storage vessel comprises an ice battery. The ice battery comprises a storage tank configured to store thermal energy in the form of ice and chilled liquid, and a chiller coupled to a refrigerant loop. The refrigerant loop is coupled to the storage tank and operable to transfer thermal energy between the chiller and storage tank to form ice. The ice battery further comprises a heat exchanger coupled to the refrigerant loop, a liquid inlet, and a liquid outlet. The heat exchanger is configured to cool heated liquid received from (Continued)

the liquid inlet and supply cooled liquid to the liquid outlet using the thermal energy stored in the storage tank via the refrigerant loop. According to some embodiments, a regasification and cold thermal energy storage system comprises an ice battery and a liquefied gas regasification system.

6 Claims, 9 Drawing Sheets

(56) References Cited

U.S. PATENT DOCUMENTS

| | | | |
|---|---|---|---|
| 6,178,770 B1 * | 1/2001 | Bradley, Jr. | F28D 20/021 165/172 |
| 6,216,469 B1 * | 4/2001 | Miller | A23L 3/36 62/434 |
| 6,216,486 B1 * | 4/2001 | Aaron | F25D 16/00 165/910 |
| 9,989,271 B1 * | 6/2018 | Becker | F24F 5/0021 |
| 2009/0093916 A1 * | 4/2009 | Parsonnet | F24F 5/0017 700/286 |
| 2013/0233392 A1 | 9/2013 | Aarseth et al. | |
| 2014/0196474 A1 | 7/2014 | Yoo et al. | |

FOREIGN PATENT DOCUMENTS

| | | | |
|---|---|---|---|
| JP | 2015135217 A * | 7/2015 | |
| WO | WO-2012162646 A1 * | 11/2012 | G06Q 10/06 |

OTHER PUBLICATIONS

PCT International Search Report for International application No. PCT/US2017/063056—dated Feb. 5, 2018.

PCT Written Opinion of the International Searching Authority for International application No. PCT/US2017/063056—dated Feb. 5, 2018.

* cited by examiner

ICE BATTERY VESSEL AND COLD ENERGY STORAGE

PRIORITY

This nonprovisional application is a U.S. National Stage Filing under 35 U. S. C, § 371 of International Patent Application Serial No. PCT/US2017/063056 filed Nov. 22, 2017 and entitled "Ice Battery Vessel and Cold Energy Storage", which claims priority to U.S. Provisional Application No. 62/556,675, filed Sep. 11, 2017, both of which are hereby incorporated by reference in their entirety.

TECHNICAL FIELD

This disclosure relates generally to cold thermal energy storage systems, including an ice battery outfitted on a marine vessel (e.g., a barge) configured to store cold thermal energy, as well as an ice battery in conjunction with a liquefied gas regasification system.

BACKGROUND

A cold thermal energy storage system may be referred to as an ice battery. An ice battery supplies cold or chilled water for cooling applications, such as air conditioning or refrigeration. A data center is an example of a cooling application that draws a large cooling load. Another example is a district cooling system. A district cooling system provides chilled water service to multiple customers (e.g., buildings) within the district system.

An ice battery may be used in a closed loop system where chilled water is pumped via a piping system to various buildings within a district cooling network, data center facility, and/or other end users, providing air-conditioning and/or cooling capacity during peak demand periods. An ice battery shifts electricity usage from peak hours, when rates are high, to off-peak hours when rates are lower.

The ice battery produces ice from a chiller, typically via refrigeration at night during off-peak electricity hours, which provides substantial cost savings. The stored ice melts slowly in the closed loop piping system the following day to satisfy district cooling chilled-water demand. This causes less stress on the electricity grid at peak hours, levels the electrical load (day/night), and increases the overall electrical efficiency of the power plant while lowering its carbon footprint. Additionally, an ice battery uses significantly less space than a traditional chilled water storage plant.

SUMMARY

According to some embodiments, a floating cold thermal energy storage vessel comprising an ice battery. The ice battery comprises a storage tank configured to store thermal energy in the form of ice and chilled liquid, and a chiller coupled to a refrigerant loop. The chiller operable to cool the refrigerant in the refrigerant loop. The refrigerant loop is coupled to the storage tank and operable to transfer thermal energy between the chiller and storage tank to cool the liquid in the storage tank to form ice. The ice battery further comprises a heat exchanger coupled to the refrigerant loop, a liquid inlet, and a liquid outlet. The heat exchanger is configured to cool heated liquid received from the liquid inlet and supply cooled liquid to the liquid outlet using the thermal energy stored in the storage tank via the refrigerant loop.

In particular embodiments, the storage tank is integrated into a hull of the floating thermal energy storage vessel. A space between the storage tank and the hull may comprise thermal insulation.

In particular embodiments, the liquid outlet and the liquid inlet are coupled to a district cooling source or a heat generation source.

In particular embodiments, the floating cold thermal energy storage vessel is moored in a water body proximate to the district cooling source or the heat generation source.

In particular embodiments, the refrigerant comprises at least one of glycol, ammonia, and lithium bromide (LiBr). The chiller may comprise one or more of a compression chiller and an absorption chiller.

According to some embodiments, a regasification and cold thermal energy storage system comprises an ice battery. The ice battery comprises a storage tank configured to store thermal energy in the form of ice and chilled liquid, and a first chiller coupled to a refrigerant loop. The first chiller is operable to cool the refrigerant in the refrigerant loop. The refrigerant loop is coupled to the storage tank and operable to transfer thermal energy between the first chiller and the storage tank to cool the liquid in the storage tank to form ice. The ice battery further comprises a heat exchanger coupled to the refrigerant loop, a liquid inlet, and a liquid outlet. The heat exchanger is configured to cool heated liquid received from the liquid inlet and supply cooled liquid to the liquid outlet using the thermal energy stored in the storage tank via the refrigerant loop. The system further comprises a liquefied gas regasification system comprising a liquefied gas vaporizer. The liquefied gas vaporizer comprises a thermal fluid inlet and a thermal fluid outlet. The liquefied gas vaporizer is operable to use a heated thermal fluid from the thermal fluid inlet to vaporize the liquefied gas into gas, which converts the heated thermal fluid to a cooled thermal fluid that flows out the thermal fluid outlet. The thermal fluid inlet and thermal fluid outlet of the liquefied gas vaporizer are coupled to the ice battery and operable to supply cold thermal energy to the ice battery using the cooled thermal fluid from the liquefied gas vaporizer.

In particular embodiments, the liquid outlet and the liquid inlet of the ice battery are coupled to a district cooling source or a heat generation source comprising heat generation equipment that uses cold thermal energy for cooling the heat generation equipment.

In particular embodiments, the liquefied gas regasification system and the ice battery are configured to supply cold thermal energy to a heat generation source comprising heat generation equipment that uses cold thermal energy for cooling the heat generation equipment.

In particular embodiments, the chiller of the ice battery comprises an absorption chiller. A heat generation source comprises a heated fluid return line coupled to the absorption chiller to supply hot thermal energy to the absorption chiller. The absorption chiller is operable to transfer thermal energy between the absorption chiller and the storage tank to cool the liquid in the storage tank to form ice.

In particular embodiments, the ice battery further comprises a second chiller. The second chiller is coupled to the refrigerant loop and operable to cool the refrigerant in the refrigerant loop. The second chiller may be electrically powered.

In particular embodiments, the ice battery comprises a floating cold thermal energy storage vessel. The refrigerant may comprise at least one of glycol, ammonia, and lithium bromide (LiBr).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

An ice battery supplies cold or chilled water for cooling applications, such as air conditioning or refrigeration. Particular examples include a data center, a refrigeration plant, a district cooling system, or any other end user with a need for cooling capacity. An example district heating and cooling system is illustrated in FIG. 1.

Figure 1:
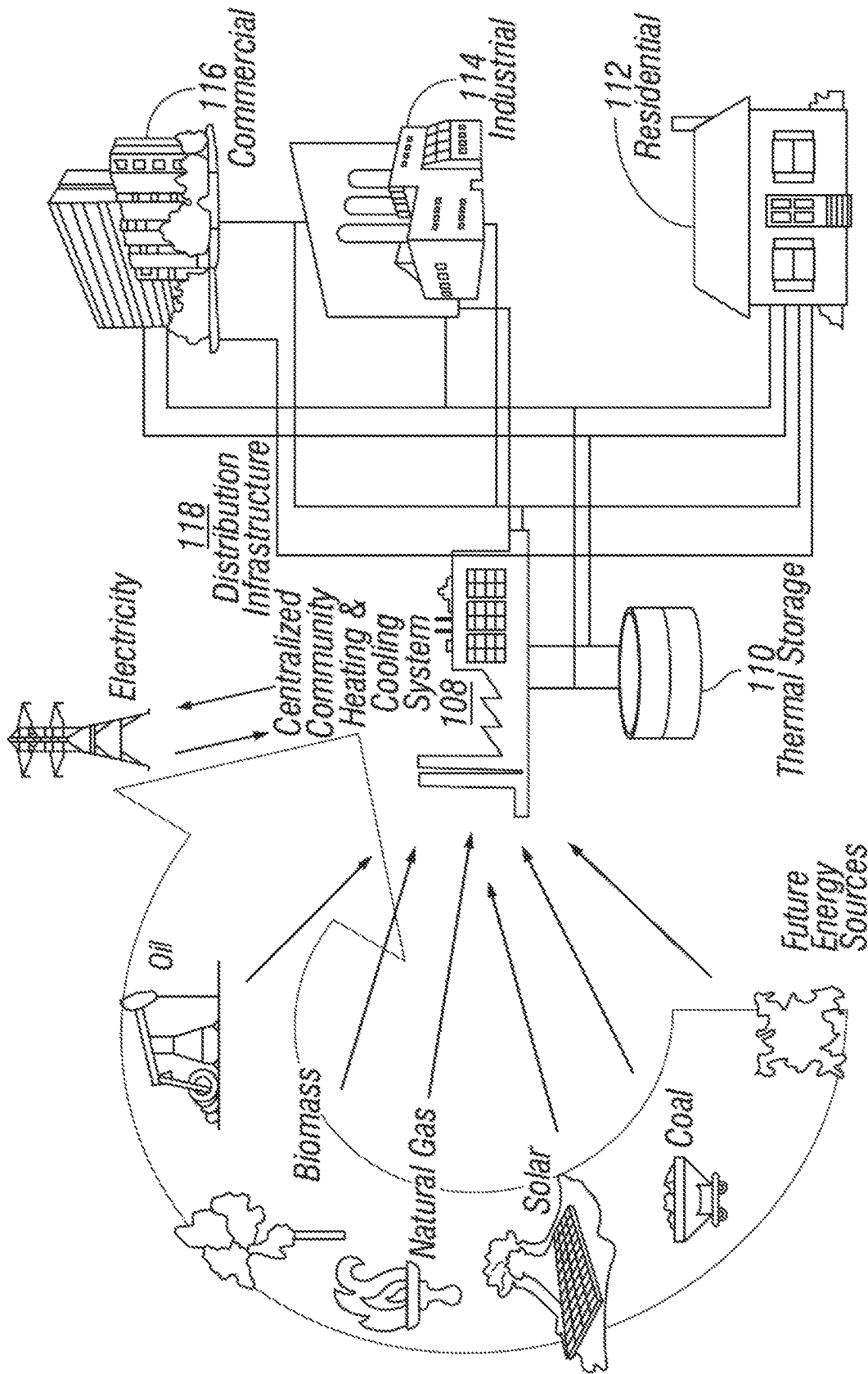
FIG. 1 is a block diagram illustrating an example district heating and cooling system.

FIG. 1 is a block diagram illustrating an example district heating and cooling system. Centralized heating and cooling system 108 provides heating (e.g., hot water) and/or cooling (e.g., cold water) to various structures such as residential homes 112, industrial facility 114, and commercial building 116 via distribution infrastructure 118. Distribution infrastructure 118 may include under or above ground pipes for circulating hot and cold water. Centralized heating and cooling system 108 may be connected to thermal storage tank(s) 110. Thermal storage tank(s) 110 may store thermal energy so that centralized heating and cooling system 108 may optimize use of its other energy sources (e.g., off-peak electricity usage). In some embodiments, centralized cooling system 108 and thermal storage tank(s) 110 may comprise an ice battery.

Figure 3:
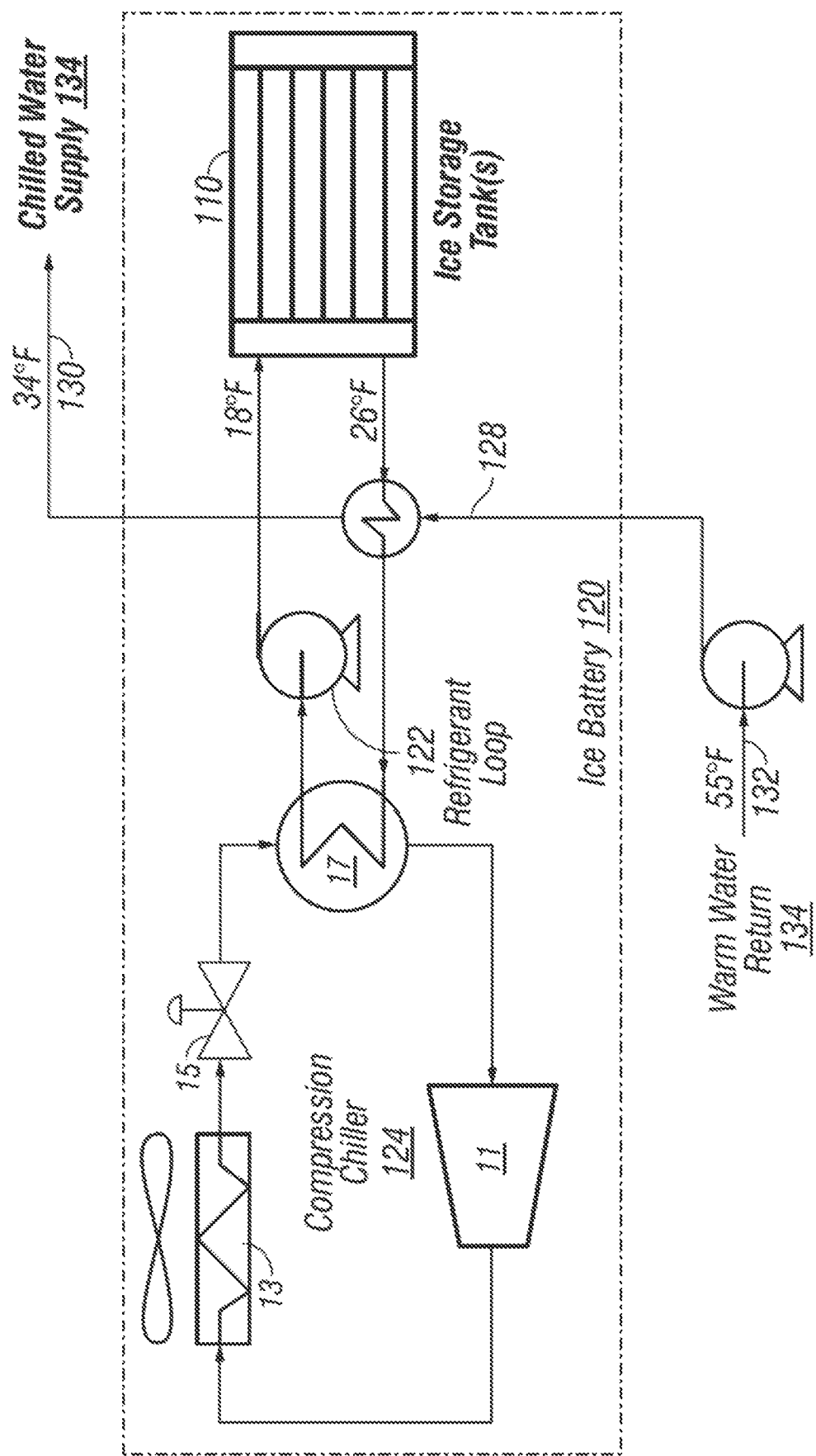
Figure 4:
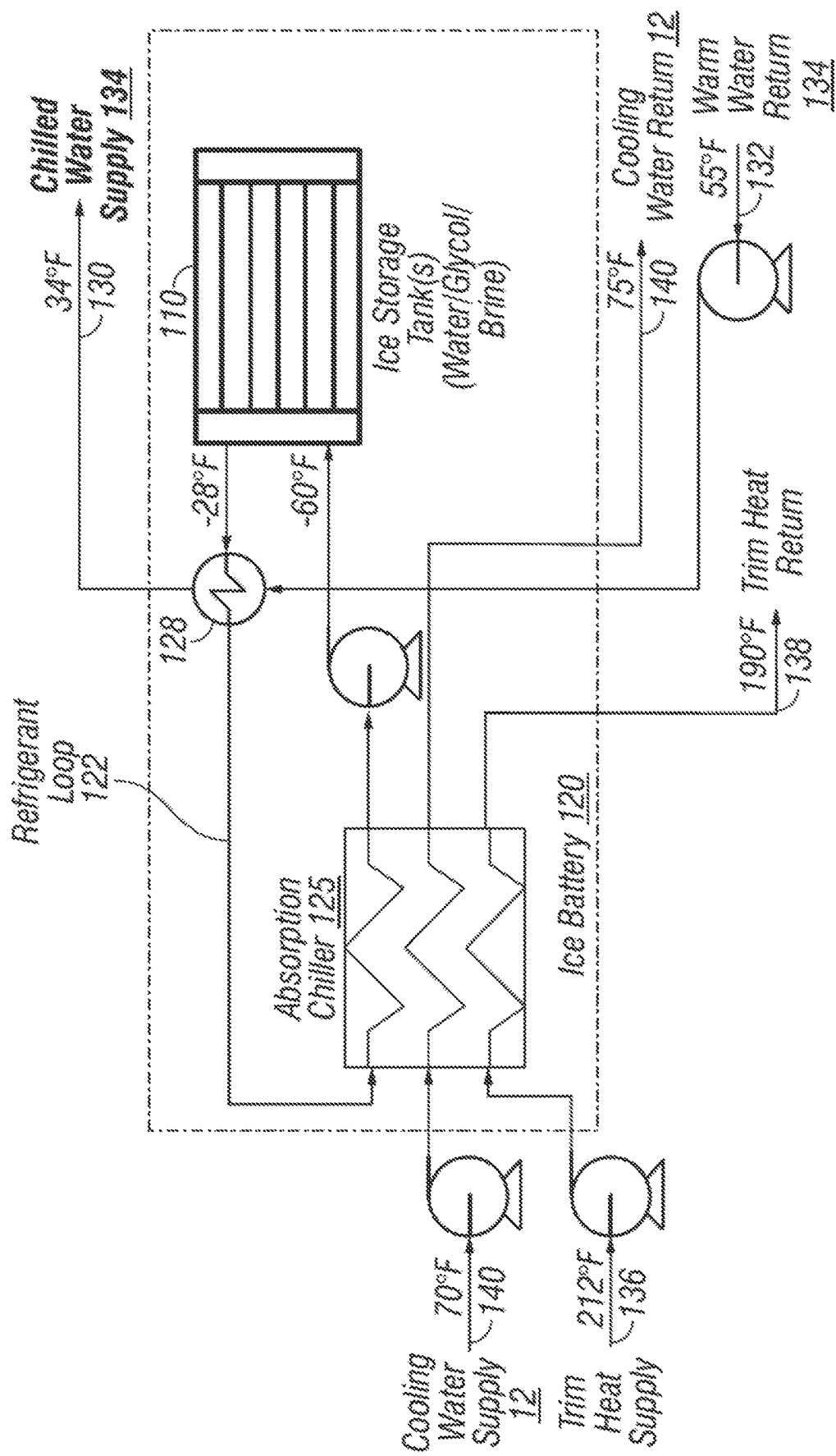

District heating and cooling facilities are more prevalent in dense urban areas, because the dense concentration of customers within a relatively small district makes district heating and cooling more efficient than in a sparsely populated area. A problem, however, is that in densely populated areas, real estate may be expensive or unavailable. Many of these locations may be located within cities situated along coastlines or inland waterways. For these locations, particular embodiments include a floating ice battery in the form of a marine vessel with integrated ice tanks and chilling equipment. Examples of ice batteries are illustrated in FIGS. 2-4.

Figure 2:
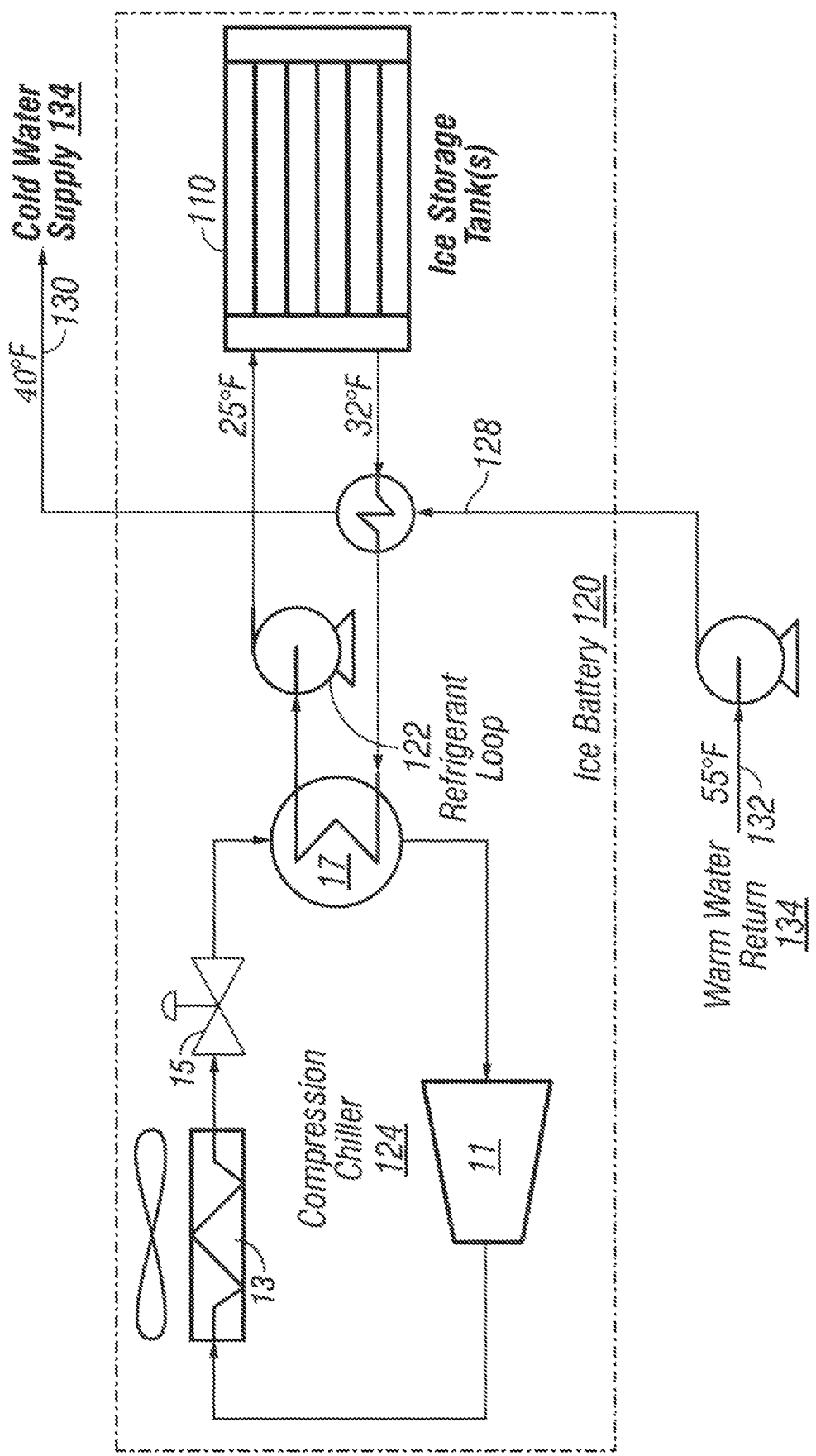
FIGS. 2-4 illustrate particular examples of an ice battery.

FIG. 2 illustrates an example ice battery. Ice battery 120 includes ice storage tank 110. Ice storage tank 110 stores ice and/or chilled liquid (e.g., a mixture of water, glycol, brine, etc.) that is made into ice. For example, ice storage tank 110 may receive and circulate chilled liquid from refrigerant loop 122. In some embodiments, ice storage tank 110 includes a corrosion inhibitor.

Refrigerant loop 122 may circulate a liquid such as glycol, ammonia, lithium bromide (LiBr), or any other suitable refrigerant based on the cooling needs and environmental conditions. The chilled liquid circulating in refrigerant loop 122 may cause ice to form in ice storage tank 110. In some embodiments, refrigerant loop 122 may include additional components not illustrated, such as pumps and/or valves.

A chiller, such as compression chiller 124, cools the liquid in refrigerant loop 122. Compression chiller 124 may include compressor 11, condenser 13, expansion valve 15 and heat exchanger 17. Compression chiller 124 cools a refrigerant contained within a closed-loop through vapor compression from compressor 11 followed by vapor condensation from condenser 13 then throttling from expansion valve 15. Heat exchanger 17 may transfer the thermal energy from the chiller loop to refrigerant loop 122.

One or more components of compression chiller 124 may run on electrical power. The chiller, such as compression chiller 124, may operate during off-peak hours to conserve and/or balance energy usage. For example, compression chiller 124 may not operate continuously, but only as needed. Compressor chiller 124 may operate overnight (i.e., off-peak time) to generate ice in storage tank 110. During the day, the ice in storage tank 110 may be used to chill the refrigerant in refrigerant loop 122. When a threshold amount of ice has melted in storage tank 110, compressor chiller 124 may be activated again to replenish the ice.

An output of ice storage tank 110 may be connected to heat exchanger 128 by refrigerant loop 122. Heat exchanger 128 is operable to cool warm water return 132 from end user 134 and supply cold water 130 back to end user 134 in a closed loop system. End user 134 is a district cooling network, data center facility, or any other suitable end user for cooling demand.

FIG. 3 illustrates another example ice battery. The example illustrates that various properties of ice battery 120 may be modified based on the desired temperature of the chilled water output. For example, FIG. 2 illustrates a particular configuration where the input to ice storage tank 110 is 25 degrees F. and the output from ice storage tank 110 is 32 degrees F., which results in a cold water supply of 40 degrees F. The warm water return is approximately 55 degrees F. FIG. 3 illustrates a particular configuration using a combination of water and glycol or brine that achieves lower freezing temperatures for ice formation. The input to ice storage tank 110 is 18 degrees F. and the output is 26 degrees F., which results in a chilled water supply of 34 degrees F. The illustrated temperatures are examples, and some embodiments may include any suitable temperatures or temperature ranges for a particular application or environment.

Particular embodiments may chill the liquid in other ways than those illustrated in FIGS. 2 and 3. Another example is illustrated in FIG. 4.

FIG. 4 illustrates an example ice battery using an absorption chiller. A chiller, such as absorption chiller 125, provides cooling to refrigerant loop 122 (e.g., ammonia/LiBr), which in turn makes ice in ice storage tank(s) 110. Absorption chiller 125 receives heat at trim heat supply 136 and returns cooled trim heat at trim heat return 138. Absorption chiller 125 also includes cooling water line 140 to supply cooling water from water body 12 to dump rejected heat, and to return used cooling water back to water body 12.

Absorption chillers are heat-driven cooling machines. Instead of a mechanical compressor, absorption chillers use a thermal system with a refrigerant, such as lithium bromide (LiBr) or ammonia, as an environmentally sound alternative to CFCs. Absorption chillers may be used in a large number of petrochemical power and district cooling applications to provide custom-designed refrigeration solutions with capacities of up to 25 MW producing chilled water down to 2° C. (35.6° F.), for example.

Single-stage LiBr-absorption chillers use hot water with temperatures down to 9° C. (194° F.) as the energy source, while two-stage LiBr-absorption chillers need about 170° C. (381° F.), which means that they are normally steam-fired. A single-stage LiBr-absorption chiller producing water at 6-8° C. (43-46° F.) has a coefficient of performance (COP) of about 0.7 and a two-stage chiller a COP of about 1.2. This means that they can produce a cooling capacity corresponding to 0.7 or 1.2 times the heat source capacity.

In particular embodiments, an ice battery, such as those described with respect to FIGS. 2-4, may be integrated into a marine vessel, such as a barge. An ice barge may be permanently berthed to a jetty, dock, pilings, or other facilities providing a minimal footprint with benefits in an established, densely populated urban area, where district cooling systems are prevalent. In addition, the problems of premium priced real estate (either leased or purchased) and/or insufficient land availability for a traditional land based ice battery during development and buildout may be avoided. An example is illustrated in FIG. 5.

Figure 5:
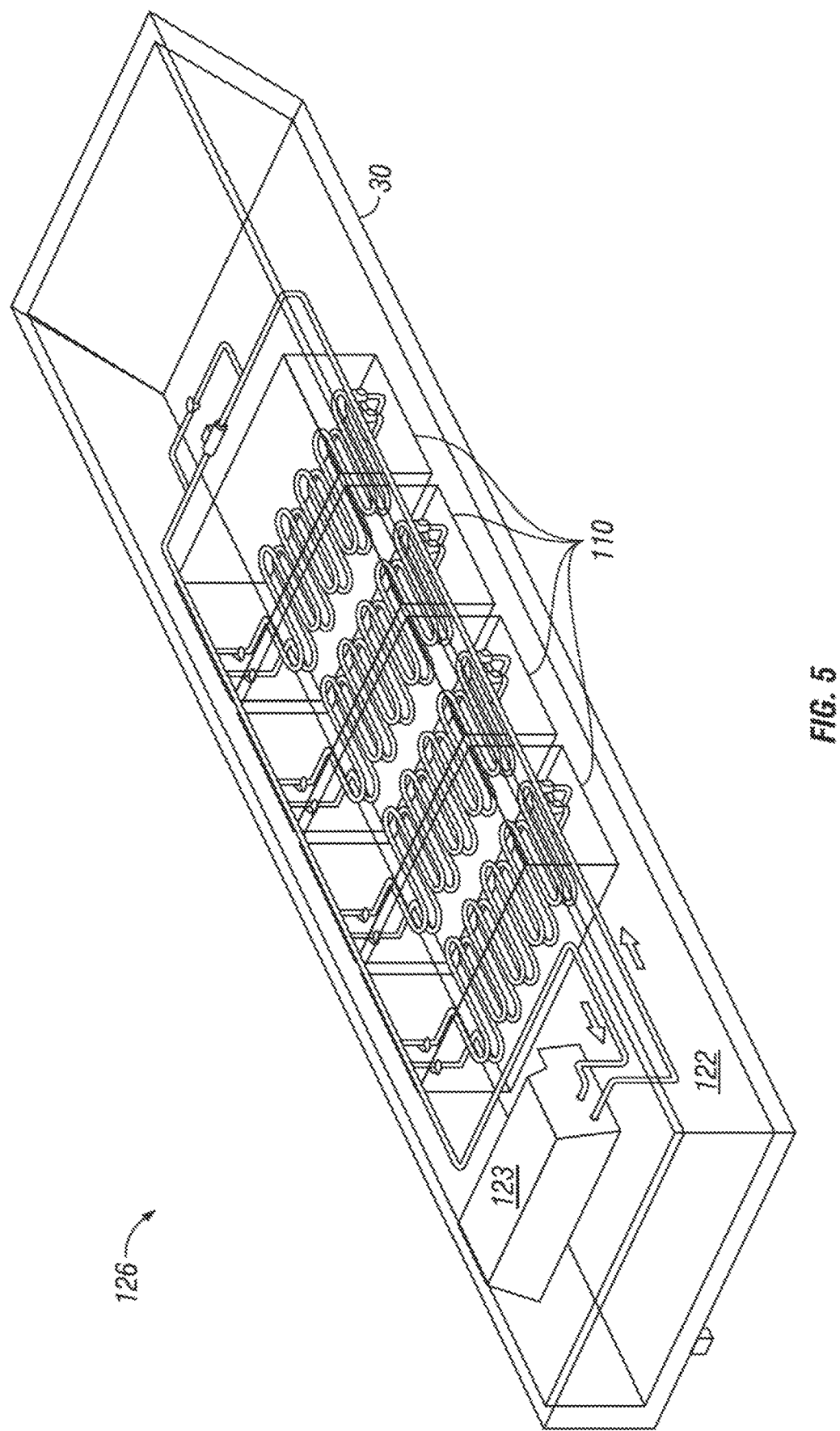
FIG. 5 illustrates an ice battery barge, according to a particular embodiment.

FIG. 5 illustrates an ice battery barge, according to a particular embodiment. Refrigerant loop 122 (e.g., glycol, ammonia, LiBr, etc.), chiller 123 (e.g., compression, absorption, etc.), and ice storage tank 110 are similar to those described with respect to FIGS. 2-4.

Ice battery barge 126 includes vessel hull 30. In the illustrated embodiment, portions of refrigerant loop 122 and chiller 123 are located on the deck of vessel hull 30. In other embodiments, refrigerant loop 122, storage tank(s) 110, and chiller 123 may be located above or below deck, or any other suitable location.

Located within vessel hull 30, according to some embodiments, are ice storage tank(s) 110. Chiller 123 cools the temperature of the liquid that flows through refrigerant loop 122 in an internal closed-loop system. The liquid flowing through refrigerant loop 122 freezes the thermal fluid stored in ice storage tank(s) 110 to create ice.

In particular embodiments, ice storage tank 110 may be insulated. For example, hull voids around ice storage tanks 110 may be coated with a spray-on insulating material (and/or comparable thermal energy containment insulation system) to more efficiently maintain the temperature of the thermal fluid in ice storage tanks 110.

As described with respect to FIGS. 2-4, refrigerant loop 122 may include a heat exchanger (such as heat exchanger 128) for cooling warm water return 132 from end user 134 and supply cold water 130 back to end user 134 in a closed loop system. End user 134 may be a district cooling network, data center facility, or any other suitable end user for cooling demand. In particular embodiments, heat exchanger 128 may be located on ice battery barge 126, or refrigeration loop 122 may extend to land and heat exchanger 128 may be located on land.

The size and capacity of various components, such as ice storage tank 110, chiller 123, and refrigerant loop 122 may vary based on a desired cooling output and cold thermal energy storage capacity of ice battery barge 126. Two examples are illustrated in FIGS. 6 and 7.

Figure 6:
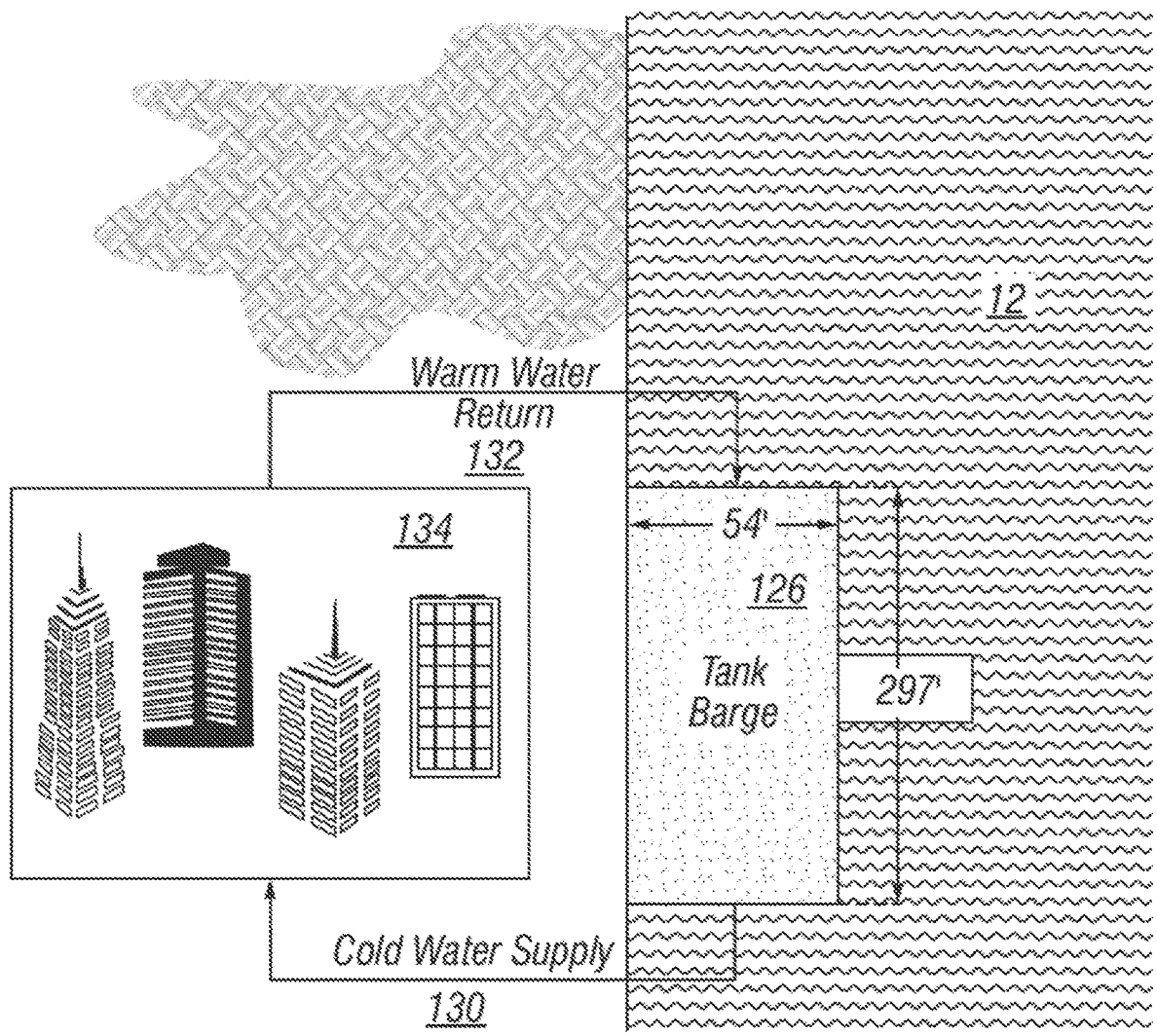
FIGS. 6 and 7 are block diagrams illustrating an ice battery barge as a district cooling source, according to some embodiments.

FIG. 6 is a block diagram illustrating an ice battery barge as a district cooling source, according to some embodiments. Ice battery barge 126 is moored in water body 12 in relative proximity (e.g., particular distances may depend on environmental conditions, pipe type for transporting liquid, government or safety rules and regulations, etc.) to a district cooling source. In some embodiments, ice battery barge 126 may not be in a floating condition and/or may be intentionally bottom founded. The desired location for deployment may be close to the district cooling underground piping system and the lack of water depth is assumed to be a generally static condition.

In particular embodiments, ice battery barge 126 may provide cooling for several large commercial buildings. As one example, ice battery barge 126 may comprise a Trinity Marine Products, Inc. floating "Ice Tank Barge (Vessel)" with 30,000 barrels (42 gallons per barrel) of storage for cold thermal energy. Each approximately 300 foot length by 54 foot beam barge may store up to 1.26 million gallons of ice. Such an ice battery barge may have the following characteristics: thermal capacity: 89,100 ton-hrs (314,000 kWh); peak load reduction: 3.7 MW; max volume: 30,000 bbl (1.26 Mgal); weight limit: 4,540 tons; ice mass: 3,720 tons; and service area: 1,860,000 ft$^2$.

Figure 7:
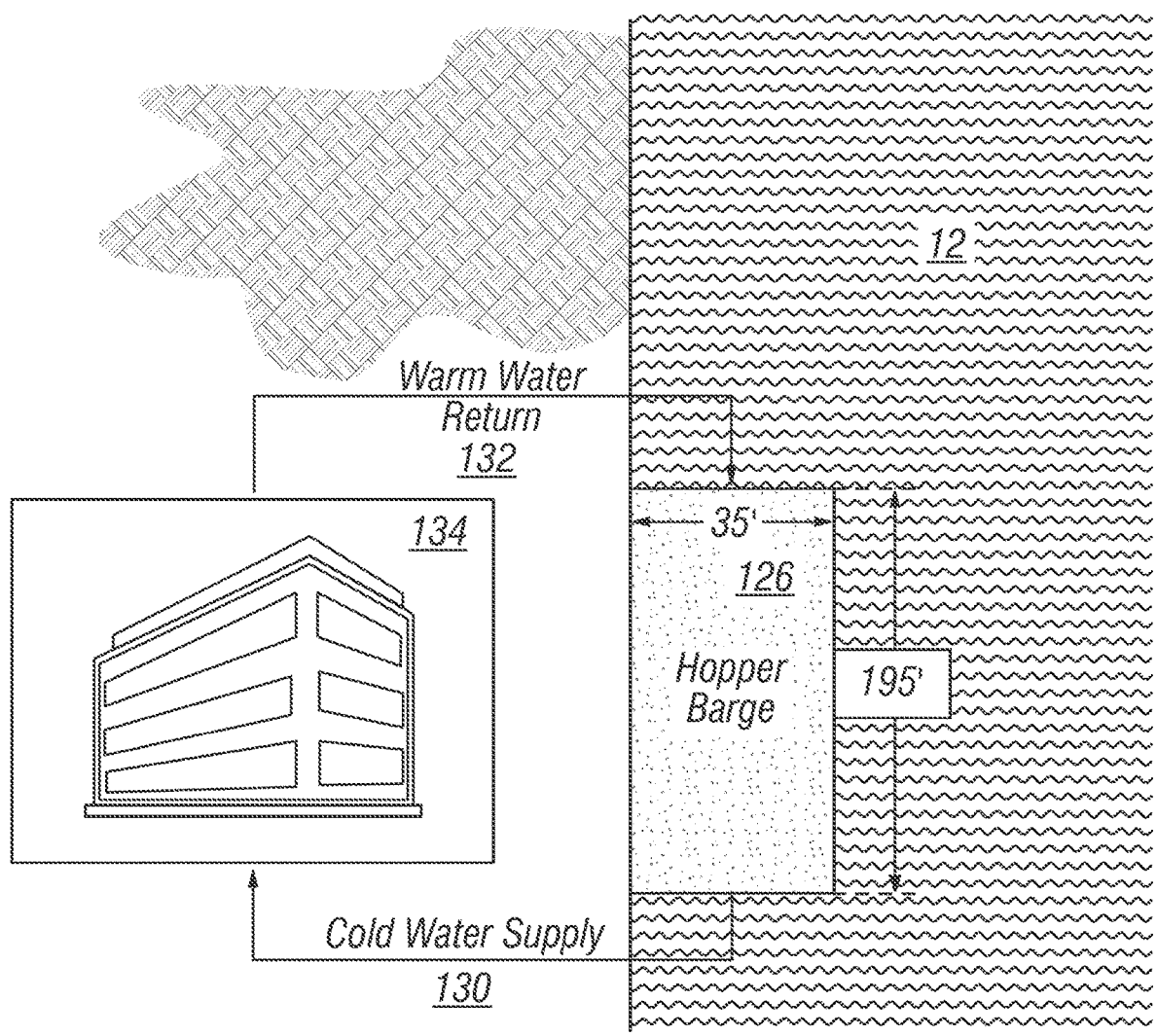

FIG. 7 is a block diagram illustrating another ice battery barge as a district cooling source, according to some embodiments. Ice battery barge 126 is moored in water body 12 in relative proximity to a district cooling source. In particular embodiments, ice battery barge 126 may provide cooling for a single commercial building.

As one example, ice battery barge may comprise a Trinity Marine Products, Inc. floating "Ice Hopper Barge (Vessel)". The hoppers may be converted to ice storage tanks 110 for storing thermal fluid/ice. Such an ice battery barge may have the following characteristics: thermal capacity: 29,500 ton-hrs (104,000 kWh); peak load reduction: 1.2 MW; max volume: 8,560 bbl (360,000 gal); weight limit: 1,500 tons; ice mass: 1,230 tons; and service area: 614,000 ft$^2$.

Other embodiments may use any other suitable barge or marine vessel. For example, some embodiments may include a deck barge. Ice storage tanks 110, chiller 123 and refrigerant loop 122 may be disposed on the deck of the deck barge.

Particular embodiments avoid problems associated with land-based ice batteries. For example, reconfiguring a deck barge, hopper barge, tank barge, etc. to an ice battery barge may provide increased chilled water supply and/or redundancy for conventional land-based primary systems. Additional advantages include fast-track deployment, scalability, and a cost-effective solution for swing demand.

The ice battery barge may be permanently berthed to a jetty, dock, pilings or other facilities providing a minimal footprint resulting in benefits for an established densely populated urban area, where district cooling systems are prevalent. In addition, the problems of premium priced real estate (either leased or purchased) and/or insufficient land availability for a traditional land based ice battery during development and buildout may be avoided.

By incorporating the ice storage into the barge itself, a project/utility developer does not need to design separate tanks for the ice battery. In some embodiments, the barge structure may be used to support ice storage tank(s). The system components to create ice in the tanks may also be installed in or on the barge. In some embodiments, if heat is needed in addition to cooling, the barge/vessel may be set up to supply heat or a combination of heat and cold.

Particular embodiments may use an absorption chiller with ammonia or a different refrigerant with trim heat or thermal heating redundancy and/or arbitrage, based on reliability, economics, and required demand. The addition of an absorption chiller may necessitate an open loop system, which would only be applicable in permitted jurisdictions.

Particular embodiments provide a fast-track scalable solution that significantly reduces the capital and operating expenditures associated with medium and large land-based district cooling facilities employing ice storage and chiller technologies.

As one advantage, the time required for permitting and leasing of land and onsite building construction and/or renovation for land-based facilities can take significant time. Deployment time may be accelerated considerably by constructing the ice battery on a barge at a fabrication yard in advance and subsequently deploying the barge to an urban location along a river bank or shoreline.

Capital expenditures for buildings can be significantly high for land-based facilities, requiring transportation of equipment and materials to a single land-based location which may be in congested urban locations, which could make logistics expensive. Alternatively, the land-based facility may be located further away from desired clientele due to zoning issues or lack of available space in an urban setting, requiring significant spans of underground piping to reach end users. In comparison, floating facilities such as the ice battery barge have a distinct advantage in the many cities that are located along coastlines and inland waterways because the facilities can be constructed at a fabrication yard with more convenient access to materials and equipment and closer proximity to end users. By using the barge as the ice tanks, the project/utility developer does not need to manufacture tanks as well as a building structure to house all of the ice battery components including the tanks.

As another advantage, the acquisition and leasing of land-based real estate for an ice storage and/or chiller building typically incurs a significant operating expenditure, which is considerably higher than a floating facility.

As an environmental advantage for ice batteries utilizing a refrigeration loop, cooling water is provided in a closed-loop configuration that avoids the problems associated with an open loop configuration that dumps thermal heat into inland or coastal waterways, which may require lengthy environmental permitting processes or be denied altogether in certain jurisdictions. A closed-loop configuration using the ice battery barge avoids these environmental permitting issues altogether.

The ice battery barge also includes a number of advantages compared to cooling towers, which are frequently used to provide cooling water. Cooling towers can have issues with legionella in water systems, and as such, oftentimes require treatment with costly chemicals, measurements and record keeping, and may sometimes have additional permitting or approval steps depending on jurisdiction. Cooling towers also require a constant supply of makeup water and sometimes experience accumulation of total dissolved solids (TDS), which can result in operability issues. All of these problems are avoided through the use of cold thermal energy storage, taking advantage of cheap electricity prices during off-peak hours. In addition, when using an absorption chiller with ammonia or a different refrigerant, the ice battery barge may be attractive for markets where access to power is unreliable, limited, or costly even during off-peak hours. This can also be attractive for markets where fuel costs are cheap or there is an opportunity for trigeneration by adding cold energy for combined cooling, heat, and power (CCHP).

In some embodiments the ice battery may be used with other floating or non-floating applications, such as regasification systems. An example is illustrated in FIG. 8.

Figure 8:
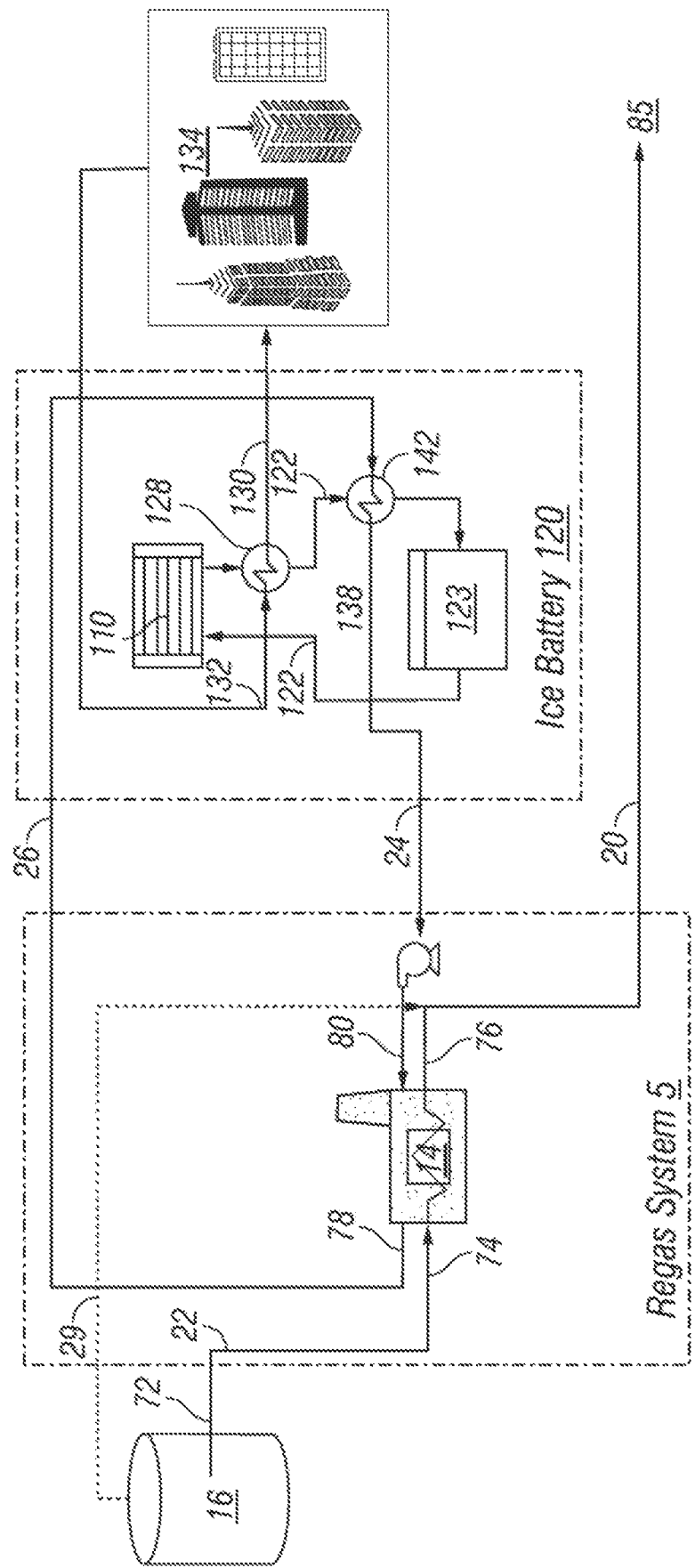
FIGS. 8 and 9 are block diagrams illustrating an ice battery in conjunction with a liquefied gas (e.g., liquefied natural gas (LNG)) regasification system, according to some embodiments.

FIG. 8 is a block diagram illustrating an ice battery in conjunction with a liquefied gas (e.g., liquefied natural gas (LNG)) regasification system, according to a particular embodiment. Regasification system 5 includes liquefied gas vaporizer system 14 and liquefied gas storage tank(s) 16. Liquefied gas vaporizer system 14 supplies natural gas to end-users 85 through distribution pipeline 20.

Liquefied gas storage tank(s) 16 stores and supplies liquefied gas to liquefied gas vaporizer system 14 via liquefied gas supply line 22. Liquefied gas storage tank(s) 16 may either be in the form of a floating or land-based storage configuration.

Liquefied gas storage tanks(s) 16 include liquefied gas outlet 72. Liquefied gas outlet 72 may be coupled to liquefied gas inlet 74 of liquefied gas vaporizer system 14 via liquefied gas supply line 22. Some embodiments may include any suitable number of liquefied gas supply lines 22. In particular embodiments, liquefied gas storage tank(s) 16 comprises a conventional floating liquefied gas storage vessel, such as a first generation 125,000 m$^3$ LNG carrier.

Liquefied gas vaporizer system 14 may include any suitable vaporizer or combination of vaporizers (hybrid platform). For example, some embodiments may include a submerged combustion vaporizer (SCV) paired with another vaporizer technology. Selection of vaporizer is based on site location, climatic conditions, throughput requirement, and regulatory controls with ever increasing environmental oversight.

Liquefied gas vaporizer system 14 comprises liquefied gas inlet 74 and natural gas outlet 76. Liquefied gas vaporizer system 14 vaporizes liquefied gas received from liquefied gas inlet 74 into natural gas and sends the natural gas downstream via natural gas outlet 76 coupled to distribution pipeline 20 to end-users 85.

Liquefied gas vaporizer system 14 also comprises thermal liquid inlet 80 and thermal liquid outlet 78. Liquefied gas vaporizer system 14 uses heated thermal liquid received from thermal fluid supply line 24 at thermal liquid inlet 80 to vaporize the liquefied gas (e.g., LNG) into gas (e.g., natural gas). The conversion process removes heat from the heated thermal liquid, resulting in a cooled thermal liquid. The cooled thermal liquid is discharged through thermal liquid outlet 78 to thermal fluid return line 26.

In some embodiments, thermal fluid supply line 24 and thermal fluid return line 26 may be coupled to ice battery 120 (e.g., via heat exchanger 142). Thermal fluid return line 26 provides cooled thermal fluid from liquefied gas vaporizer system 14 to ice battery 120. Thermal fluid supply line 24 provides heated thermal fluid from ice battery 120 to liquefied gas vaporizer system 14.

As one example configuration, ice battery 120 includes ice storage tank(s) 110, chiller 123, and refrigerant loop 122 (e.g., glycol, ammonia, LiBr, etc.). Chiller 123 provides primary cooling to ice storage tank(s) 110. Chiller 123 cools the temperature of the liquid that flows through refrigerant loop 122 in an internal closed-loop system.

Regasification system 5 provides secondary cooling to ice storage tank(s) 110. Regasification system 5 supplies trim cold thermal energy produced by the liquefied gas vaporizer system 14 via thermal fluid return line 26. For example, thermal fluid return line 26 may be coupled to one side of heat exchanger 142 coupled to refrigerant loop 122 of ice battery 120. The other side of heat exchanger 142 may be coupled to thermal fluid supply line 24 to supply heated thermal fluid back to liquefied gas vaporizer system 14.

Some embodiments include a thermal fluid storage tank (not illustrated). For example, a particular regasification system 5 may include a thermal fluid storage tank for storing and heating thermal fluid. In such embodiments, the both sides of the heat exchanger 142 may be coupled to thermal fluid return line 26. Thermal fluid return line 26 may supply the heated fluid from ice battery 120 to the thermal fluid storage tank where the thermal fluid may be further heated. The thermal fluid storage tank may be coupled to liquefied gas vaporizer system 14 via thermal fluid supply line 24.

Ice battery 120 supply cold water via cold water supply line 130 to end users 134, and receives warm water via warm water return line 132 from end users 134. Cold water supply line 130 to end users 134 and warm water return line 132 from end users 134 establish an external closed-loop system.

An advantage of using ice battery 120 in conjunction with regasification system 5 is that the thermal fluid used in liquefied gas vaporizer 14 may be sent to ice battery 120 to provide additional cooling capacity. In particular embodiments, the warmed thermal fluid may be returned to liquefied gas vaporizer 14 in a closed-loop system to increase gas vaporization and minimize fuel usage by regasification system 5. The thermal fluid from either regasification system 5 or ice battery 120 may be reused to meet cooling needs for other co-located industrial processes. In particular embodiments, the cooled thermal fluid returning from the liquefied gas vaporizer system may be managed and/or sold as a liquefied gas cryogenic energy commodity, which results in thermal energy optimization.

For example, cold energy may be used by a nearby cold storage warehouse/refrigeration plant or commercial/industrial facility (e.g., frozen food/fish, refrigerated produce, data center, power plant, CCHP or trigeneration, gas reciprocating units, district cooling, etc.), which may purchase the cooling duty for use in its refrigeration lines before returning the warmed coolant back to liquefied gas vaporizer 14, enhancing liquefied gas vaporization by minimizing fuel usage for regasification.

In some embodiments the ice battery may be used with cold thermal fluid and heat generation facilities such as power plants coupled with regasification systems. An example is illustrated in FIG. 9.

Figure 9:
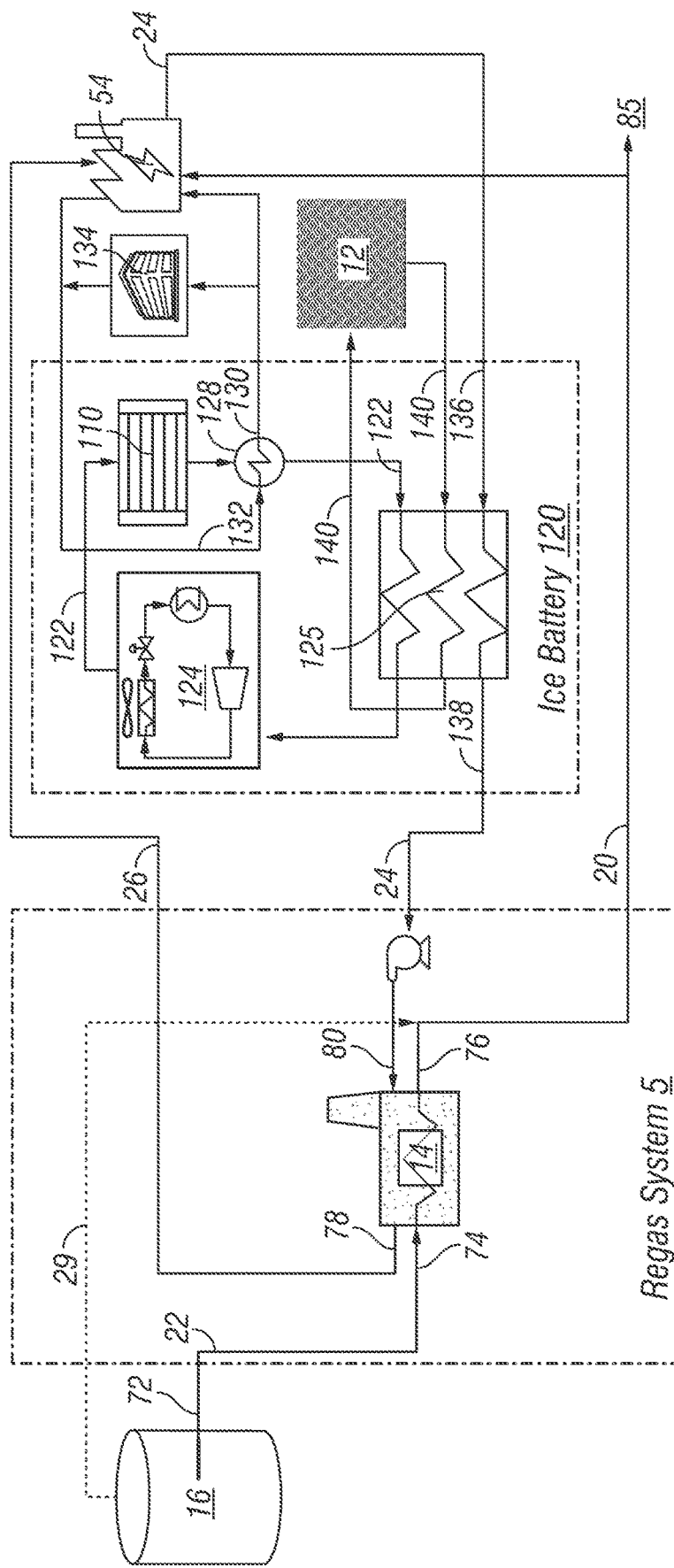

FIG. 9 is a block diagram illustrating an ice battery in conjunction with both a liquefied gas (e.g., liquefied natural gas (LNG)) regasification system and a cold thermal fluid heat generation facility, according to a particular embodiment. As an industrial example, cold thermal fluid heat generation facility 54 may comprise a gas fired turbine/power generation plant, which may be collocated near regasification system 5.

The gas fired turbine/power generation plant may use cooled thermal fluid return line 26 and/or cold water supply line 130 for chilling and/or cooling some of its power plant machinery and equipment (e.g., gas turbine air inlet chilling and/or condenser cooling). Other end-users 134 may also use chilled water, such as for district cooling purposes.

Cold thermal fluid heat generation facility 54 is located along thermal fluid return line 26, whereby cooled thermal fluid is supplied by liquefied gas vaporizer system 14. Ice battery 120 may also supply chilled water 130 to thermal fluid heat generation facility 54. Cold thermal fluid heat generation facility 54 uses both the cooled thermal fluid via thermal fluid return line 26 and via cold water supply line 130 before returning the heated thermal fluid to liquefied gas vaporizer system 14 via thermal fluid return line 24 and to ice battery 120 via warm water return line 132.

In some embodiments, the vaporization process may result in a cooled thermal fluid (e.g., of approximately 40° F.). Cold thermal fluid heat generation facility 54 (e.g., gas fired turbine/power generation plant) may use the cooled thermal liquid in any of its processes.

The process(es) of cold thermal fluid heat generation facility 54 will add rejected heat to the thermal fluid, therefore increasing the temperature (e.g., from 40 degree F.) to a higher temperature. In some embodiments, thermal fluid supply line 24 may supply heated thermal fluid to heat supply 136 of absorption chiller 125 to provide cooling for ice battery 120. Absorption chiller 125 trim heat return 138 is then fed into thermal fluid supply line 24. Absorption chiller 125 may necessitate an open loop system due to dumping of rejected heat into cooling water line 140. An adequate heat sink for cooling water line 140 may be water body 12, which is only applicable in permitted jurisdictions.

Liquefied gas vaporizer 14 may not require trim heat (i.e., no additional thermal heat energy required to reheat the thermal fluid back to the desired hot temperature) if the aforementioned industrial/commercial process of cold thermal fluid heat generation facility 54 is employed, even with absorption chiller 125 in service to make ice for ice storage tank(s) 110. Accordingly, a particular advantage is that if cold thermal fluid heat generation facility 54 is a gas fired turbine/power generation plant, ice battery 120 can provide additional cooling capacity to the facility during peak demand hours, thereby increasing electrical power generation efficiency and decreasing the required fuel consumption to maintain a certain electrical load. Ice storage tank(s) 110 and absorption chiller 125 may be sized appropriately to provide sufficient additional cooling capacity for peak demand hours.

Compression chiller 124, for example, may be run during off-peak hours to maximize ice stored in ice storage tank 110. Also, absorption chiller 125 may convert residual heat from power plant 54 transferred via thermal fluid supply line 24 into additional cooling. Broadening the temperature range of the Rankine cycle increases the efficiency of power plant 54. Utilizing ice stored in ice storage tank 110, power plant 54's waste heat recovery may be maximized during peak demand hours which shifts some of the load from off-peak hours to increase the effective MW power output during high demand cycles. In cases where absorption chiller 125 captures additional waste heat, the overall efficiency of power plant 54 improves while lowering the carbon footprint. Adding ice battery 120 with a new waste heat recovery system that includes a hot battery to an existing power plant 54 (e.g., solar, concentrated solar, or simple cycle power plants) can either increase power generation during peak demand hours or continue providing some power during periods of intermittent supply (e.g., plant maintenance, process trips, or solar power plant evening cycles), resulting in increased reliability and in some cases improved plant economics due to superior waste heat recovery.

Particular embodiments for power generation plants include software for system design and for system operation. For example, particular embodiments may manage exhaust waste heat to increase and/or decrease MW power output. Some embodiments may increase or decrease trim cooling (Mmbtu/hr) with consideration for increasing and/or decreasing available cold thermal energy for gas turbine inlet chilling and/or condenser cooling for maximum power performance and efficiency.

While several embodiments have been provided in the present disclosure, it should be understood that the disclosed systems and methods might be embodied in many other specific forms without departing from the spirit or scope of the present disclosure. The present examples are to be considered as illustrative and not limited to the details given herein. For example, the various elements or components may be combined and/or integrated in another system and/or certain features may be omitted, or not implemented.

In addition, techniques, systems, subsystems, and methods described and illustrated in the various embodiments as discrete or separate may be combined and/or integrated with other systems, modules, techniques and/or methods without departing from the scope of the present disclosure. Other items shown or discussed as coupled and/or directly coupled or communicating with each other may be indirectly coupled or communicating through some interface, device, or intermediate component whether electrically, mechanically or otherwise. Other examples of changes, substitutions, and alterations are ascertainable by one skilled in the art and could be made without departing from scope disclosed herein.

The invention claimed is:

1. A floating cold thermal energy storage vessel comprising an ice battery, the ice battery comprising:
   a storage tank configured to store thermal energy in the form of ice and chilled liquid, wherein the storage tank is integrated into a hull of the floating thermal energy storage vessel;
   a chiller coupled to a refrigerant loop, the chiller operable to cool the refrigerant in the refrigerant loop;
   the refrigerant loop coupled to the storage tank and operable to transfer thermal energy between the chiller and storage tank to cool the liquid in the storage tank to form ice; and
   a heat exchanger coupled to the refrigerant loop, a liquid inlet, and a liquid outlet, the heat exchanger configured to cool heated liquid received from the liquid inlet and supply cooled liquid to the liquid outlet using the thermal energy stored in the storage tank via the refrigerant loop.

2. The floating cold thermal energy storage vessel of claim 1, wherein a space between the storage tank and the hull comprises thermal insulation.

3. The floating cold thermal energy storage vessel of claim 1, wherein the liquid outlet and the liquid inlet are coupled to a district cooling source.

4. The floating cold thermal energy storage vessel of claim 3, wherein the floating cold thermal energy storage vessel is moored in a water body proximate to the district cooling source.

5. The floating cold thermal energy storage vessel of claim 1, wherein the refrigerant comprises at least one of glycol, ammonia, and lithium bromide (LiBr).

6. The floating cold thermal energy storage vessel of claim 1, wherein the chiller comprises one or more of a compression chiller and an absorption chiller.

* * * * *